United States Patent
Huang et al.

(10) Patent No.: US 10,218,957 B2
(45) Date of Patent: Feb. 26, 2019

(54) METHOD OF SUB-PU SYNTAX SIGNALING AND ILLUMINATION COMPENSATION FOR 3D AND MULTI-VIEW VIDEO CODING

(71) Applicant: HFI INNOVATION INC., Zhubei, Hsinchu County (TW)

(72) Inventors: Han Huang, Beijing (CN); Xianguo Zhang, Beijing (CN); Jicheng An, Beijing (CN); Jian-Liang Lin, Su'ao Township, Yilan County (TW); Kai Zhang, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 323 days.

(21) Appl. No.: 14/905,705

(22) PCT Filed: Jun. 18, 2015

(86) PCT No.: PCT/CN2015/081753
§ 371 (c)(1),
(2) Date: Jan. 15, 2016

(87) PCT Pub. No.: WO2015/192781
PCT Pub. Date: Dec. 23, 2015

(65) Prior Publication Data
US 2016/0165209 A1    Jun. 9, 2016

(30) Foreign Application Priority Data

Jun. 20, 2014 (WO) ................ PCT/CN2014/080406
Jun. 23, 2014 (WO) ................ PCT/CN2014/080516
Feb. 6, 2015 (WO) ................ PCT/CN2015/072428

(51) Int. Cl.
*H04N 13/00* (2018.01)
*H04N 19/44* (2014.01)
(Continued)

(52) U.S. Cl.
CPC ......... *H04N 13/161* (2018.05); *H04N 13/128* (2018.05); *H04N 13/15* (2018.05);
(Continued)

(58) Field of Classification Search
CPC ........... H04N 13/0048; H04N 13/0445; H04N 19/44; H04N 19/51; H04N 19/136;
(Continued)

(56) References Cited

U.S. PATENT DOCUMENTS

2012/0044322 A1 * 2/2012 Tian .................... H04N 19/597
348/43
2013/0156099 A1 6/2013 Sasai et al.
(Continued)

FOREIGN PATENT DOCUMENTS

| CN | 102497565 | 6/2012 |
|---|---|---|
| WO | 2014075625 A1 | 5/2014 |

OTHER PUBLICATIONS

International Search Report dated Sep. 23, 2015, issued in application No. PCT/CN2015/081753.
(Continued)

*Primary Examiner* — Zaihan Jiang
(74) *Attorney, Agent, or Firm* — McClure, Qualey & Rodack, LLP

(57) ABSTRACT

A method of sub-PU (prediction unit) syntax element signaling for a three-dimensional or multi-view video coding system is disclosed. A first syntax element associated with a texture sub-PU size is transmitted only for texture video data and a second syntax element associated with a depth sub-PU size is transmitted only for depth video data. The first syntax element associated with the texture sub-PU size is used to derive an IVMP (inter-view motion prediction) prediction candidate used for a texture block. The second syntax element associated with the depth sub-PU size is used to a (Continued)

MPI (motion parameter inheritance) prediction candidate for a depth block.

12 Claims, 7 Drawing Sheets

(51) Int. Cl.
| | |
|---|---|
| *H04N 19/51* | (2014.01) |
| *H04N 19/597* | (2014.01) |
| *H04N 19/70* | (2014.01) |
| *H04N 19/30* | (2014.01) |
| *H04N 19/187* | (2014.01) |
| *H04N 19/176* | (2014.01) |
| *H04N 19/136* | (2014.01) |
| *H04N 13/161* | (2018.01) |
| *H04N 13/128* | (2018.01) |
| *H04N 13/15* | (2018.01) |

(52) U.S. Cl.
CPC ......... *H04N 19/136* (2014.11); *H04N 19/176* (2014.11); *H04N 19/187* (2014.11); *H04N 19/30* (2014.11); *H04N 19/44* (2014.11); *H04N 19/51* (2014.11); *H04N 19/597* (2014.11); *H04N 19/70* (2014.11); *H04N 2013/0077* (2013.01); *H04N 2013/0081* (2013.01)

(58) Field of Classification Search
CPC .. H04N 13/0022; H04N 19/70; H04N 19/187; H04N 13/0037; H04N 19/597; H04N 2013/0081; H04N 2013/0077
USPC ..................................................... 375/240.01
See application file for complete search history.

(56) References Cited

U.S. PATENT DOCUMENTS

| | | | | |
|---|---|---|---|---|
| 2014/0022343 | A1* | 1/2014 | Chen | H04N 19/70 348/43 |
| 2014/0294088 | A1* | 10/2014 | Sung | H04N 19/597 375/240.16 |
| 2015/0085929 | A1* | 3/2015 | Chen | H04N 19/597 375/240.13 |
| 2015/0085935 | A1* | 3/2015 | Chen | H04N 19/597 375/240.16 |
| 2015/0172716 | A1* | 6/2015 | Chen | H04N 19/105 375/240.02 |
| 2015/0208086 | A1* | 7/2015 | Chen | H04N 19/597 375/240.17 |
| 2015/0358599 | A1* | 12/2015 | Lin | H04N 19/597 348/47 |
| 2016/0134857 | A1* | 5/2016 | An | H04N 19/597 348/43 |
| 2016/0241869 | A1* | 8/2016 | Choi | H04N 19/70 |
| 2016/0261888 | A1* | 9/2016 | Nam | H04N 19/597 |
| 2016/0277758 | A1* | 9/2016 | Ikai | H04N 19/597 |
| 2016/0366442 | A1* | 12/2016 | Liu | H04N 19/597 |

OTHER PUBLICATIONS

Tech, G., et al.; "3D-HEVC Draft Text 2;" Joint Collaborative Team on 3D Video Coding Extension Development of ITU-T SG 16 WP 3 and ISO/IEC JTC 1/SC 29/WG 11; 6th Meeting: Geneva, CH, Oct. 25-Nov. 1, 2013; pp. 1-94.

Tech, G., et al.; "3D-HEVC Draft Text 4;" Joint Collaborative Team on 3D Video Coding Extensions of ITU-T SG 16 WP 3 and ISO/IEC JTC 1/SC 29/WG 11; 8th Meeting: Valencia, ES, Mar. 29-Apr. 4, 2014; pp. 1-102.

Zhang, et al.: "3D-CE2 related: A texture-partition-dependent depth partition for 3D-HEVC"; Joint Collaborative Team on 3D Video Coding Extensions of ITU-T SG 16 WP 3 and ISO/IEC JTC 1/SC 29/WG 11; 7th Meeting: San Jose, US, Jan. 11-17, 2014; pp. 1-6.

Liu, et al.: "3D-CE2.h: Results of Illumination Compensation for Inter-View Prediction"; Joint Collaborative Team on 3D Video Coding Extension Development of ITU-T SG 16 WP 3 and ISO/IEC JTC 1/SC 29/WG 11; 2nd Meeting: Shanghai, CN, Oct. 13-19, 2012; pp. 1-7.

Tomohiro Ikai: "3D-CE5.h related: Illumination compensation regression improvement and simplification"; Joint Collaborative Team on 3D Video Coding Extensions of ITU-T SG 16 WP 3 and ISO/IEC JTC 1/SC 29/WG 11; 4th Meeting: Incheon, KR, Apr. 20-26, 2013; pp. 1-9.

Tech, et al.: "3d-HEVC Draft Text 4"; Joint Collaborative Team on 3D Video Coding Extensions of ITU-T SG 16 WP 3 and ISO/IEC JTC 1/SC 29/WG 11; 8th Meeting: Valencia, ES, Mar. 29-Apr. 4, 2014; pp. 1-7.

Chen, et al.: "CE2: Sub-PU based MPI"; Joint Collaborative Team on 3D Video Coding Extensions of ITU-T SG 16 WP 3 and ISO/IEC JTC 1/SC 29/WG 11; 7th Meeting: San Jose, US, Jan. 11-17, 2014; pp. 1-5.

Jung, et al.: "CE4.h: The results on illumination compensation using offset model"; Joint Collaborative Team on 3D Video Coding Extension Development of ITU-T SG 16 WP 3 and ISO/IEC JTC 1/SC 29/WG 11; 5th Meeting: Vienna, AT, Jul. 27-Aug. 2, 2013; pp. 1-6.

Chen, et al.: "Test Model 8 of 3D-HEVC and MV-HEVC"; Joint Collaborative Team on 3D Video Coding Extension Development of ITU-T SG 16 WP 3 and ISO/IEC JTC 1/SC 29/WG 11; 8th Meeting: Valencia, ES, Mar. 29-Apr. 4, 2014; pp. 1-26.

\* cited by examiner

METHOD OF SUB-PU SYNTAX SIGNALING AND ILLUMINATION COMPENSATION FOR 3D AND MULTI-VIEW VIDEO CODING

CROSS REFERENCE TO RELATED APPLICATIONS

The present invention claims priority to PCT Patent Application, Ser. No. PCT/CN2014/080406, filed on Jun. 20, 2014, PCT Patent Application, Ser. No. PCT/CN2014/080516, filed on Jun. 23, 2014 and PCT/CN2015/072428, filed on Feb. 6, 2015. The PCT Patent Applications are hereby incorporated by reference in their entireties.

FIELD OF INVENTION

The present invention relates to three-dimensional and multi-view video coding. In particular, the present invention relates to various aspects of three-dimensional and multi-view video coding including sub-PU (prediction unit) syntax signaling, illumination compensation, and texture-dependent depth partition.

BACKGROUND OF THE INVENTION

Three-dimensional (3D) video coding is developed for encoding or decoding video data of multiple views simultaneously captured by multiple cameras. Since all cameras capture the same scene for both the texture data and depth data, there is a large amount of redundancy between texture and depth data in the same view. According to HEVC, the coding process is applied to each block, named as coding unit (CU) and each CU is subject to prediction process. Each CU may be divided into one or more prediction units (PUs) and the prediction process, such as Intra or Inter prediction, is applied to each PU. To reduce the redundancy, a texture-partition-dependent depth partition is utilized for processing a current depth block collocated with a collocated texture CU at the same quad-tree level according to the current 3D-HEVC (3D video coding based on high efficiency video coding (HEVC)).

In order to exploit the inter-view and inter-component redundancy, additional tools such as inter-view motion prediction (IVMP) and motion parameter inheritance (MPI) have been integrated to existing 3D-HEVC (High Efficiency Video Coding) and 3D-AVC (Advanced Video Coding) codec. To further improve the coding efficiency, sub-PU level IVMP and sub-PU level MPI are used. According to IVMP, the motion information associated with a block in a dependent view is predicted by the motion information associated with a corresponding block located using a disparity vector in a reference view. According to MPI, inheritance of the texture's motion parameters for depth data is achieved by adding one more Merge candidate to the Merge list of the current depth block, in addition to the usual spatial and temporal candidates from the HEVC Merge mode. The extra candidate is generated from the motion information of the co-located texture block.

In current 3D-HEVC, a syntax element iv_mv_pred_flag [layerId] is sent for each layer with layer ID larger than zero to indicate whether IVMP is used, where the layer ID larger than zero corresponds to a dependent view. For each layer with layer ID larger than zero, another syntax element log 2_sub_pb_size_minus3[layerId] is sent to indicate the texture sub-PU size. For depth coding, a syntax element mpi_flag[layerId] is sent for each layer with layer ID larger than zero to indicate whether MPI is used. However, the sub-PU size for MPI is shared by all layers and is indicated by the syntax element log 2_mpi_sub_pb_size_minus3 in video parameter set (VPS) extension. Table 1 shows the current vps_extension2( ) syntax design in 3D-HEVC.

TABLE 1

| vps_extension2( ) { | Descriptor | Note |
|---|---|---|
| while( !byte_aligned( ) ) | | |
| vps_extension_byte_alignment_reserved_one_bit | u(1) | |
| for( i = 0; i <= vps_max_layers_minus1; i++ ) { | | |
| layerId = layer_id_in_nuh[ i ] | | |
| if ( layerId != 0 ) { | | |
| iv_mv_pred_flag[ layerId ] | u(1) | 1-1 |
| log2_sub_pb_size_minus3[ layerId ] | ue(v) | 1-2 |
| if ( !VpsDepthFlag[ layerId ] ) { | | |
| iv_res_pred_flag[ layerId ] | u(1) | |
| depth_refinement_flag[ layerId ] | u(1) | |
| view_synthesis_pred_flag[ layerId ] | u(1) | |
| depth_based_blk_part_flag[ layerId ] | u(1) | |
| } else { | | |
| mpi_flag[ layerId ] | u(1) | 1-3 |
| vps_depth_modes_flag[ layerId ] | u(1) | |
| lim_qt_pred_flag[ layerId ] | u(1) | |
| vps_inter_sdc_flag[ layerId ] | u(1) | |
| } | | |
| } | | |
| } | | |
| ... | | |
| iv_mv_scaling_flag | u(1) | |
| log2_mpi_sub_pb_size_minus3 | ue(v) | 1-4 |
| } | | |

As shown in Table 1, the syntax elements related to iv_mv_pred_flag[layerId], log 2_sub_pb_size_minus3[layerId], mpi_flag[layerId] and log 2_mpi_sub_pb_size_minus3 are signaled in video parameter set extension, vps_extension2( ). The locations of these syntax elements are indicated by notes 1-1 through 1-4 respectively in Table 1. As is known that IVMP is used for texture data to take advantage of correlation between different views. On the other hand, MPI is used for depth data to take advantage of dependency of depth data on co-located texture data. It is noted that syntax elements log 2_sub_pb_size_minus3[layerId] and log 2_mpi_sub_pb_size_minus3 are signaled in the VPS independently without considering whether the current video data is texture data or depth data. Therefore, it is desirable to develop new method for sub-PU syntax element signaling to improve the performance.

In the current 3D-HEVC, illumination compensation (IC) is adopted to compensate the difference of illumination intensity between different views. When the IC is applied, the prediction value, y of a current block (110) in the current view is calculated based on a linear function (120) corresponding to y=a*x+b, where x is a sample value in the reference block in the reference view. In the linear model, parameter a is named as a multiplicative term and parameter b is named as an offset term. The two parameters a and b are derived according to training process (130) using the neighboring reconstructed samples (140) of the current block and the neighboring reconstructed samples (150) of the reference block (160) as depicted FIG. 1.

Samples involved in the training process according to HEVC are shown in FIG. 2, where a neighboring reference sample $x_i$ of the reference block (160) and a neighboring sample $y_i$ of the current block (110) possessing the same relative position (i.e., co-location) are used as a training pair. To reduce the number of training pairs, only one of every two adjacent samples are involved in the training set. The neighboring samples without labelling (i.e., $x_i$ or $y_i$) are not used in the training process. The superscript "A" associated with $x_i$ and $y_i$ indicates that the neighboring samples are "Above" the block. The superscript "L" associated with $x_i$ and $y_i$ indicates that the neighboring samples are "Left" to the block.

The number of training pairs is proportional to the block size. For example, there are 8 training pairs for an 8×8 block and 64 training pairs for a 64×64 block. Therefore, the training process will be more complex for larger blocks.

The IC is applied to each color component, such as Y (Luma), U (Cb) and V (Cr) separately. The training process is also performed separately. The parameters a and b are trained independently for each component.

The basic procedures for calculating a and b are shown in the following equations:

$$a = \frac{\sum_{i=0}^{N-1} y(i)x(i) - \sum_{i=0}^{N-1} y(i) \sum_{i=0}^{N-1} x(i)}{\sum_{i=0}^{N-1} x(i)x(i) - \sum_{i=0}^{N-1} x(i) \sum_{i}^{N-1} x(i)}, \quad (1)$$

and $$b = \sum_{i=0}^{N-1} y(i) - a \times \sum_{i=0}^{N-1} x(i). \quad (2)$$

As depicted above, the complexity of IC is mainly due to the linear least square (LLS) method utilized for training a better a and b in both encoder and decoder. The LLS based training process requires multiple regular multiplication operations. According to the existing 3D-HEVC or 3D-AVC, the IC process is utilized for both uni-direction prediction and bi-directional prediction for both luminance and chroma components. Therefore, the IC process according to the existing 3D-HEVC or 3D-AVC requires intensive computations due to the multiplication operations. Therefore, it is desirable to simplify the IC process, particularly the LLS procedures involved.

In 3D video coding, a coding tool named texture-dependent depth partition (TDDP) has been developed for depth partition by taking advantage of correlation between the texture data and the depth data. To reduce the redundancy, the TDDP is utilized when the collocated coding unit (CU) of the current depth CU is at the same quad-tree level in the current 3D-HEVC.

FIG. 3 illustrates the correspondence between the allowed depth partitions and the corresponding texture partitions according to the TDDP of existing 3D-HEVC, where AMP (asymmetric motion partition is allowed). The texture partitions are shown on the left-hand side and the depth partitions are shown on the right-hand side. As shown in FIG. 3, when the collocated texture CU at the same quad-tree level is coded with vertical partitions, only vertical partitions and 2N×2N partition are allowed for the corresponding depth CU. Similarly, when the collocated texture CU at the same quad-tree level is coded with horizontal partitions, only horizontal partitions and 2N×2N partition are allowed for the corresponding depth CU. When the collocated texture CU at the same quad-tree level is coded with the N×N partition, the corresponding depth CU can use all partitions including both vertical and horizontal partitions, 2N×2N partition and N×N partition. When the collocated texture CU at the same quad-tree level is coded with the 2N×2N partition, the corresponding depth CU can only use the 2N×2N partition. As shown in FIG. 3, the vertical partitions include N×2N, nL×2N and nR×2N and the horizontal partitions include N×2N, nL×2N and nR×2N. Tables 2 and 3 show the two kinds of possible correspondences between part_mode values and prediction partition for Inter prediction. Table 2 presents the case that the partition mode only depends on part_mode. For Intra coding, 2N×2N and N×N partitions are allowed and part_mode has a value being 0 or 1. Table 3 shows the case that the partition mode depends on both part_mode and a partition variable partPredIdc. The partition variable partPredIdc can be interpreted as a texture partition type, where partPredIdc equal 1 represents horizontal partition, partPredIdc equal 2 represents vertical partition and partPredIdc equal 0 represents other partitions (i.e., 2N×2N or N×N).

TABLE 2

|  | part_mode | PartMode |
|---|---|---|
| Intra coding modes | 0 | PART_2N×2N |
|  | 1 | PART_N×N |
| Inter coding modes | 0 | PART_2N×2N |
|  | 1 | PART_2N×N |
|  | 2 | PART_N×2N |
|  | 3 | PART_N×N |
|  | 4 | PART_2N×nU |
|  | 5 | PART_2N×nD |
|  | 6 | PART_nL×2N |
|  | 7 | PART_nR×2N |

TABLE 3

|  | part_mode | partPredIdc | PartMode |
|---|---|---|---|
| Intra coding modes | 0 | 0 | PART_2N×2N |
|  | 1 | 0 | PART_N×N |
| Inter coding modes | 0 | 0, 1, 2 | PART_2N×2N |
|  | 1 | 0 | PART_2N×N |
|  | 1 | 1 | PART_2N×N |
|  | 1 | 2 | PART_N×2N |
|  | 2 | 0 | PART_N×2N |
|  | 2 | 1 | PART_2N×nU |
|  | 2 | 2 | PART_nL×2N |
|  | 3 | 0 | PART_N×N |
|  | 3 | 1 | PART_2N×nD |
|  | 3 | 2 | PART_nR×2N |
|  | 4 | 0 | PART_2N×nU |
|  | 5 | 0 | PART_2N×nD |
|  | 6 | 0 | PART_nL×2N |
|  | 7 | 0 | PART_nR×2N |

In semantics, when the collocated texture CU at the same quad-tree level is coded with horizontal or vertical, the variable partPredIdc is set equal to 1 or 2 respectively. When the collocated texture block has a larger depth or non-horizontal-and-vertical partitions, partPredIdc is set equal 0. In this way, the part_mode flag, which indicates the partition mode, can be either encoded with shorter bin string or the same as HEVC does.

However, in the existing 3D-HEVC (i.e., Working Draft 6), there is validity checking on the partition mode for the depth data. In particular, the existing 3D-HEVC only checks whether the current mode is an Intra or Inter mode and whether AMP (asymmetric motion partition) mode is enabled. Consequently, an illegal partition mode may be received at a decoder, while TDDP is utilized and partPredIdc is not equal to 0. Therefore, it is desirable to develop a partition mode coding for TDDP to ensure no illegal partition mode may occur or to ensure the decoder still operates properly in case of an illegal partition mode is received.

SUMMARY OF THE INVENTION

A method of sub-PU (prediction unit) syntax element signaling for a three-dimensional or multi-view video coding system incorporating an embodiment according to the present invention is disclosed. A first syntax element associated with a texture sub-PU size is transmitted only for texture video data and a second syntax element associated with a depth sub-PU size is transmitted only for depth video data. The first syntax element associated with the texture sub-PU size is used to derive an IVMP (inter-view motion prediction) prediction candidate used for a texture block. The second syntax element associated with the depth sub-PU size is used to a MPI (motion parameter inheritance) prediction candidate for a depth block.

The first syntax element and the second syntax element can be signaled in video parameter set (VPS), sequence parameter set (SPS), adaptive parameter set (APS), or slice header. The first syntax element can be signaled only in each texture coding layer with layer ID larger than zero. The first syntax element may correspond to log 2_sub_pb_size_minus3. The second syntax element can be signaled only in each depth coding layer with layer ID larger than zero. The second syntax element may correspond to log 2_mpi_sub_pb_size_minus3.

A method of simplified illumination compensation (IC) of video data in three-dimensional (3D) or multi-view coding systems is also disclosed. According to embodiments of the present invention, the LLS procedure (linear least squares procedure) is skipped or a non-LLS procedure is used for deriving the multiplicative term or the offset term in at least one condition selected from a group consisting of a) at least one color component when the video data consists of multiple color components, b) at least one prediction direction when the current block is coded using multiple prediction directions, and c) at least one inter-prediction mode when the current block is coded using multiple inter-prediction modes.

The LLS procedure can be skipped for deriving the multiplicative term in bi-directional prediction modes when the current block is coded using the bi-directional prediction modes. The IC process can be skipped when the current block is coded using bi-directional prediction modes. Alternatively, when the IC mode is turned on, bi-directional prediction modes are not used. Furthermore, when the IC mode is turned on, flags in a video stream specifying prediction directions can be restricted to either forward prediction direction or backward prediction direction.

The non-LLS procedure for deriving the multiplicative term, the offset term or both may comprise at least one of following steps: a) setting the multiplicative term and the offset term to predefined values; b) setting only the multiplicative term to a predefined value and deriving the offset term from the current neighboring samples and the reference neighboring samples; c) replacing a division operation for a denominator corresponding to a sum of the current neighboring samples by a division-translated-to-multiplication values operation; and d) determining the multiplicative term and the offset term according to decoded values from syntax elements transmitted in a video stream. For example, the multiplicative term and the offset term can be set to 1 and 0 respectively. In another example, the multiplicative term can be set to 1 and the offset term can be set to a difference between a first sum of the current neighboring samples and a second sum of the reference neighboring samples. In yet another example, the multiplicative term and the offset term are determined from the syntax elements transmitted in a sequence, picture, slice, coding unit (CU), prediction unit (PU) or transform unit (TU) level of the video stream.

When the video data consists of multiple color components, the multiplicative term can be set to 1 and the offset term can be set to a difference between a first sum of the current neighboring samples and a second sum of the reference neighboring samples for chroma components. Furthermore, when the current block is smaller than M×L, the LLS procedure can be skipped for deriving the multiplicative term, where M and L are positive integers. If bi-directional prediction is selected for the current block, the LLS procedure can be skipped for deriving the multiplicative term and the offset term, or a forward prediction direction is used for the current block and other prediction information stays unchanged.

Another aspect of the present invention addresses illegal partition mode issue in 3D or multi-view coding systems. In one embodiment, the encoder signals a syntax element part_mode having a part_mode value depending on a current texture partition variable to indicate a depth partition mode for the current depth block. The current texture partition variable is associated with a current texture partition type of the texture partition mode of the co-located texture block. The encoder will ensure the syntax element part_mode signaled will always result in a legal partition mode for the depth block. If the texture partition variable has a value corresponding to horizontal partition, the syntax element part_mode signaled is restricted to a horizontal mode or partition PART_2N×2N mode. If asymmetric motion partition (AMP) is allowed, the syntax element part_mode signaled is restricted to a group consisting of partition PART 2N×2N mode, horizontal PART_2N×N mode, asymmetric horizontal 2N×nU mode and asymmetric horizontal 2N×nD mode. If AMP is not allowed, the syntax element part_mode is restricted to a group consisting of partition PART 2N×2N mode and horizontal PART_2N×N mode.

If the texture partition variable has a value corresponding to vertical partition, the syntax element part_mode is restricted to a vertical mode or partition mode PART_2N×2N. If AMP is allowed, the syntax element part_mode is restricted to a group consisting of partition PART_2N×2N mode, vertical PART_N×2N mode, asymmetric vertical nL×2N mode and asymmetric vertical nR×2N mode. If AMP is not allowed, the syntax element part_mode is restricted to a group consisting of partition PART_2N×2N mode and vertical PART_N×2N mode.

If the texture partition variable has a value corresponding to horizontal partition or vertical partition, the syntax element part_mode is restricted to a horizontal mode or partition PART_2N×2N mode.

In another embodiment for addressing illegal partition mode issue in 3D and multi-view coding systems is achieved at the decoder side. The decoder determines whether a syntax value for the syntax element part_mode is legal in view of the texture prediction information. If the syntax value is not legal, the syntax value is replaced by a legal syntax value. The current depth block is then decoded according to the depth partition jointly indicated by the texture prediction information and the syntax element part_mode having the legal syntax value. For example, if the texture prediction mode and partition for the current texture block corresponds to an Intra mode or an Inter mode, the depth partition can be set to partition PART_2N×2N Intra mode or partition PART_2N×2N Inter mode respectively. In another example, if the texture prediction mode and partition for the current texture block corresponds to an Inter mode with horizontal partition or vertical partition, the depth partition can be set to horizontal PART_2N×N mode or vertical PART_N×2N mode respectively. In yet another example, if the syntax element part_mode received corresponds to one illegal AMP mode, the depth partition is set to horizontal PART_2N×N Inter mode if the syntax element part_mode received is asymmetric horizontal 2N×nU mode or asymmetric horizontal 2N×nD mode. The depth partition can be set to vertical PART_N×2N Inter mode if the syntax element part_mode received is asymmetric vertical nL×2N mode and asymmetric vertical nR×2N mode.

DETAILED DESCRIPTION

Figure 1:
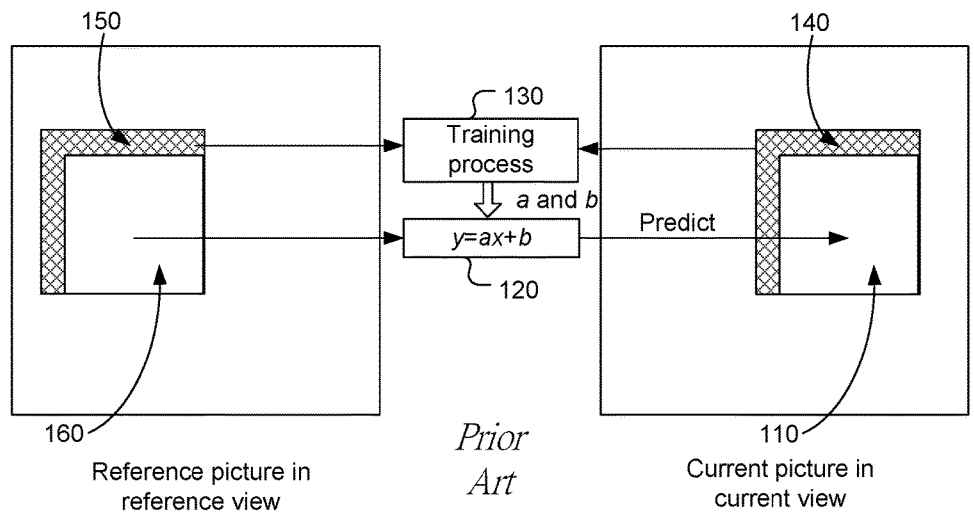
FIG. 1 illustrates an example of illumination compensation according to existing 3D-HEVC (three-dimensional video coding based on High Efficiency Video Coding).
Figure 2:
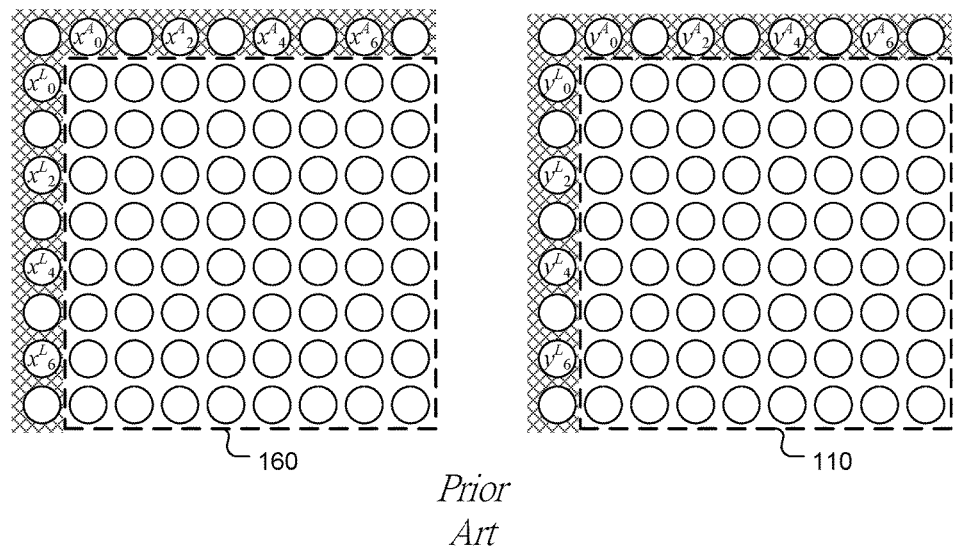
FIG. 2 illustrates an example of linear model derivation for illumination compensation using neighboring samples as training samples according to existing 3D-HEVC (three-dimensional video coding based on High Efficiency Video Coding).
Figure 3:
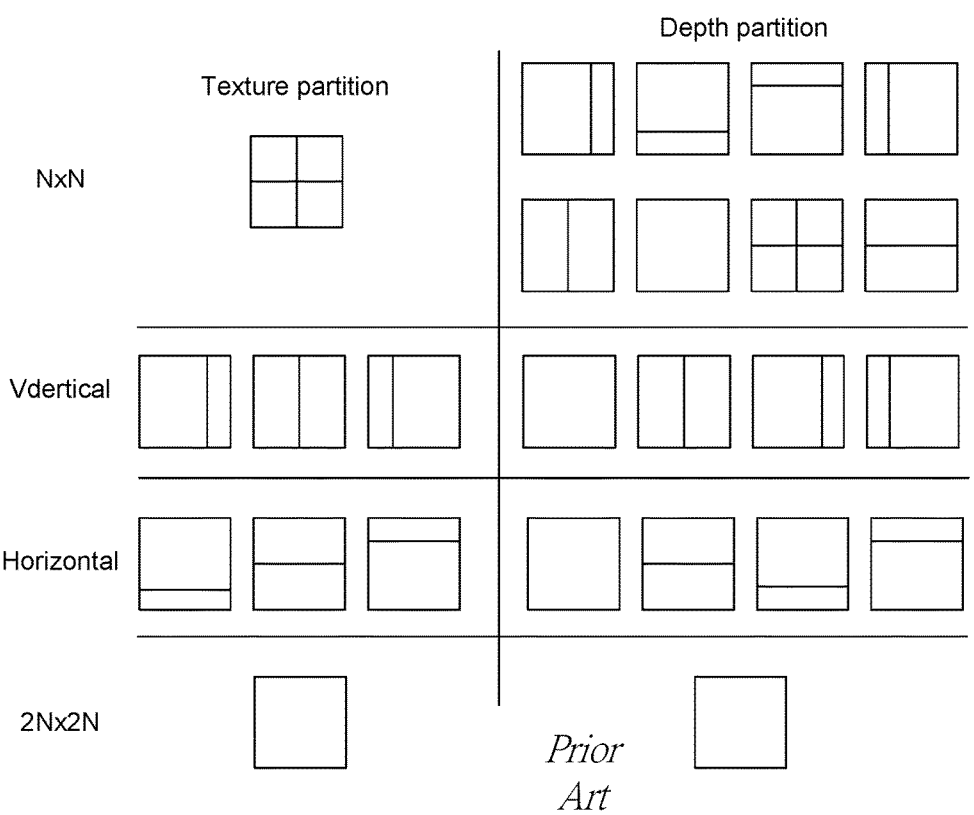
FIG. 3 illustrates current candidate depth prediction partitions for different prediction partitions of the collocated texture blocks according to existing 3D-HEVC (three-dimensional video coding based on High Efficiency Video Coding).

The following description is of the best-contemplated mode of carrying out the invention. This description is made for the purpose of illustrating the general principles of the invention and should not be taken in a limiting sense. The scope of the invention is best determined by reference to the appended claims.

As mention above, the sub-PU (prediction unit) syntax element signaling for inter-view motion prediction (IVMP) and motion parameter inheritance (MPI) in the existing 3D-HEVC may have redundancy. Accordingly, an improved method for signaling the sub-PU size syntax element is disclosed, where the same syntax element is used for sub-PU level IVMP and sub-PU level MPI, or the sub-PU size syntax element is signaled only when it is needed.

In the first embodiment of sub-PU syntax signaling for IVMP and MPI, the sub-PU size is shared by all layers and is indicated by log 2_sub_pb_size_minus3 in VPS (video parameter set) as shown in Table 4. Since the sub-PU size is shared by all layers, the syntax element, log 2_sub_pb_size_minus3 (indicated by note 4-1 in Table 4) according to this embodiment is not dependent on layer ID. In texture coding, log 2_sub_pb_size_minus3 indicate the sub-PU size of IVMP. In depth coding, log 2_sub_pb_size_minus3 indicates the sub-PU size of MPI.

TABLE 4

| vps_extension2( ) { | Descriptor | Note |
|---|---|---|
|   while( !byte_aligned( ) ) | | |
|     vps_extension_byte_alignment_reserved_one_bit | u(1) | |
|   for( i = 0; i <= vps_max_layers_minus1; i++ ) { | | |
|     layerId = layer_id_in_nuh[ i ] | | |
|     if ( layerId != 0) { | | |
|       iv_mv_pred_flag[ layerId ] | u(1) | |
|       if ( !VpsDepthFlag[ layerId ] ) { | | |
|         iv_res_pred_flag[ layerId ] | u(1) | |
|         depth_refinement_flag[ layerId ] | u(1) | |
|         view_synthesis_pred_flag[ layerId ] | u(1) | |
|         depth_based_blk_part_flag[ layerId ] | u(1) | |
|       } else { | | |
|         mpi_flag[ layerId ] | u(1) | |
|         vps_depth_modes_flag[ layerId ] | u(1) | |
|         lim_qt_pred_flag[ layerId ] | u(1) | |
|         vps_inter_sdc_flag[ layerId ] | u(1) | |
|       } | | |
|     } | | |
|   } | | |
|   ... | | |
|   iv_mv_scaling_flag | u(1) | |
|   log2_sub_pb_size_minus3 | ue(v) | 4-1 |
| } | | |

In the second embodiment of sub-PU syntax element signaling for IVMP and MPI, the sub-PU size is signaled at each layer with layer ID larger than 0 and the size syntax element is shared by IVMP and MPI as shown in Table 5, where the layer ID larger than zero indicates a dependent view and the layer ID equal to zero indicates a base view. Accordingly, syntax element log 2_sub_pb_size_minus3 [layerId] (indicated by note 5-1 in Table 5) is signaled in each layer with layer ID larger than 0 to indicate the sub-PU size of IVMP in texture coding and the sub-PU size of MPI in depth coding. Compared to the conventional syntax design in Table 1, the sub-PU size for MPI, log 2_mpi_sub_pb_size_minus3 is not signaled.

TABLE 5

| vps_extension2( ) { | Descriptor | Note |
|---|---|---|
|   while( !byte aligned( ) ) | | |
|     vps_extension_byte_alignment_reserved_one_bit | u(1) | |
|   for( i = 0; i <= vps_max_layers_minus1; i++ ) { | | |
|     layerId = layer_id_in_nuh[ i ] | | |
|     if ( layerId != 0) { | | |
|       iv_mv_pred_flag[ layerId ] | u(1) | |
|       log2_sub_pb_size_minus3[ layerId ] | ue(v) | 5-1 |
|       if ( !VpsDepthFlag[ layerId ] ) { | | |
|         iv_res_pred_flag[ layerId ] | u(1) | |
|         depth_refinement_flag[ layerId ] | u(1) | |

TABLE 5-continued

| vps_extension2( ) { | Descriptor | Note |
|---|---|---|
|       view_synthesis_pred_flag[ layerId ] | u(1) | |
|       depth_based_blk_part_flag[ layerId ] | u(1) | |
|     } else { | | |
|       mpi_flag[ layerId ] | u(1) | |
|       vps_depth_modes_flag[ layerId ] | u(1) | |
|       lim_qt_pred_flag[ layerId ] | u(1) | |
|       vps_inter_sdc_flag[ layerId ] | u(1) | |
|     } | | |
|   } | | |
| } | | |
| ... | | |
|   iv_mv_scaling_flag | u(1) | |
| } | | |

Signaling of log 2_sub_pb_size_minus3 can also be conditioned by the usage of IVMP and MPI. If IVMP or MPI is used (e.g., iv_mv_pred_flag equal to 1 or mpi_flag equal to 1), then log 2_sub_pb_size_minus3 is signaled. Otherwise, log 2_sub_pb_size_minus3 is not signaled.

The syntax element iv_mv_pred_flag and mpi_flag can also be shared by all layers, and only signaled once in VPS. For other sub-PU level techniques, similar unification method for the sub-PU syntax element can be used.

In the third embodiment of sub-PU syntax element signaling for IVMP and MPI, the syntax element log 2_sub_pb_size_minus3 is only sent in each texture coding layer with layer ID larger than zero to indicate the sub-PU size of IVMP as shown in Table 6, where the layer ID larger than zero indicates a dependent view and the layer ID equal to zero indicates a base view. As shown in Table 6, the location of syntax element log 2_sub_pb_size_minus3[layerId] (indicated by note 6-1 in Table 6) is within the condition "if (!VpsDepthFlag[layerId])", where the condition is asserted when the layer is texture data. In other words, syntax element log 2_sub_pb_size_minus3[layerId] is incorporated only for texture data.

TABLE 6

| vps_extension2( ) { | Descriptor | Note |
|---|---|---|
| while( !byte_aligned( ) ) | | |
|   vps_extension_byte_alignment_reserved_one_bit | u(1) | |
| for( i = 0; i <= vps_max_layers_minus1; i++ ) { | | |
|   layerId = layer_id_in_nuh[ i ] | | |
|   if ( layerId != 0) { | | |
|     iv_mv_pred_flag[ layerId ] | u(1) | |
|     if ( !VpsDepthFlag[ layerId ] ) { | | |
|       log2_sub_pb_size_minus3[ layerId ] | ue(v) | 6-1 |
|       iv_res_pred_flag[ layerId ] | u(1) | |
|       depth_refinement_flag[ layerId ] | u(1) | |
|       view_synthesis_pred_flag[ layerId ] | u(1) | |
|       depth_based_blk_part_flag[ layerId ] | u(1) | |
|     } else { | | |
|       mpi_flag[ layerId ] | u(1) | |
|       vps_depth_modes_flag[ layerId ] | u(1) | |
|       lim_qt_pred_flag[ layerId ] | u(1) | |
|       vps_inter_sdc_flag[ layerId ] | u(1) | |
|     } | | |
|   } | | |
| } | | |
| ... | | |
| iv_mv_scaling_flag | u(1) | |
| log2_mpi_sub_pb_size_minus3 | ue(v) | |
| } | | |

In the fourth embodiment of sub-PU syntax element signaling for IVMP and MPI, the syntax element log 2_mpi_sub_pb_size_minus3[layerId] (indicated by note 7-1 in Table 7) is also sent in each depth coding layer with layer ID larger than zero to indicate the sub-PU size of MPI as shown in Table 7, where the layer ID larger than zero indicates a dependent view. Since syntax element log 2_mpi_sub_pb_size_minus3[layerId] is incorporated when the condition "if (!VpsDepthFlag[layerId])" is false, which corresponds to the depth data. In other words, syntax element log 2_mpi_sub_pb_size_minus3[layerId] is incorporated only for depth data. To be specific, when the layer ID is larger than zero, syntax element log 2_sub_pb_size_minus3[layerId] (indicated by note 6-1 in Table 7) is signaled only for the texture coding layer while syntax element log 2_mpi_sub_pb_size_minus3[layerId] is signaled only for the depth coding layer. For the depth coding layer with layer ID equal to zero (indicating a base view), syntax element log 2_mpi_sub_pb_size_minus3[layerId] is signaled to indicate the sub-PU size of this depth coding layer. As for the texture coding layer with layer ID equal to zero, syntax element log 2_sub_pb_size_minus3[layerId] will not be sent to the decoder. Alternatively, syntax element log 2_sub_pb_size_minus3[layerId] can be sent, but will not be used by the decoder.

TABLE 7

| vps_extension2( ) { | Descriptor | Note |
|---|---|---|
| while( !byte_aligned( ) ) | | |
|   vps_extension_byte_alignment_reserved_one_bit | u(1) | |
| for( i = 0; i <= vps_max_layers_minus1; i++ ) { | | |
|   layerId = layer_id_in_nuh[ i ] | | |
|   if ( layerId != 0) { | | |
|     iv_mv_pred_flag[ layerId ] | u(1) | |
|     if ( !VpsDepthFlag[ layerId ] ) { | | |
|       log2_sub_pb_size_minus3[ layerId ] | ue(v) | 6-1 |
|       iv_res_pred_flag[ layerId ] | u(1) | |
|       depth_refinement_flag[ layerId ] | u(1) | |
|       view_synthesis_pred_flag[ layerId ] | u(1) | |
|       depth_based_blk_part_flag[ layerId ] | u(1) | |
|     } else { | | |
|       mpi_flag[ layerId ] | u(1) | |
|       log2_mpi_sub_pb_size_minus3[ layerId ] | ue(v) | 7-1 |
|       vps_depth_modes_flag[ layerId ] | u(1) | |
|       lim_qt_pred_flag[ layerId ] | u(1) | |
|       vps_inter_sdc_flag[ layerId ] | u(1) | |
|     } | | |
|   } | | |
| } | | |
| ... | | |
|   iv_mv_scaling_flag | u(1) | |
| } | | |

All related sub-PU syntax elements for IVMP and MPI can also be signaled in the other high level syntax, for examples sequence parameter set (SPS), adaptive parameter set (APS), and slice header. The above methods can be applied to other techniques that use sub-PU level processing.

Figure 4:
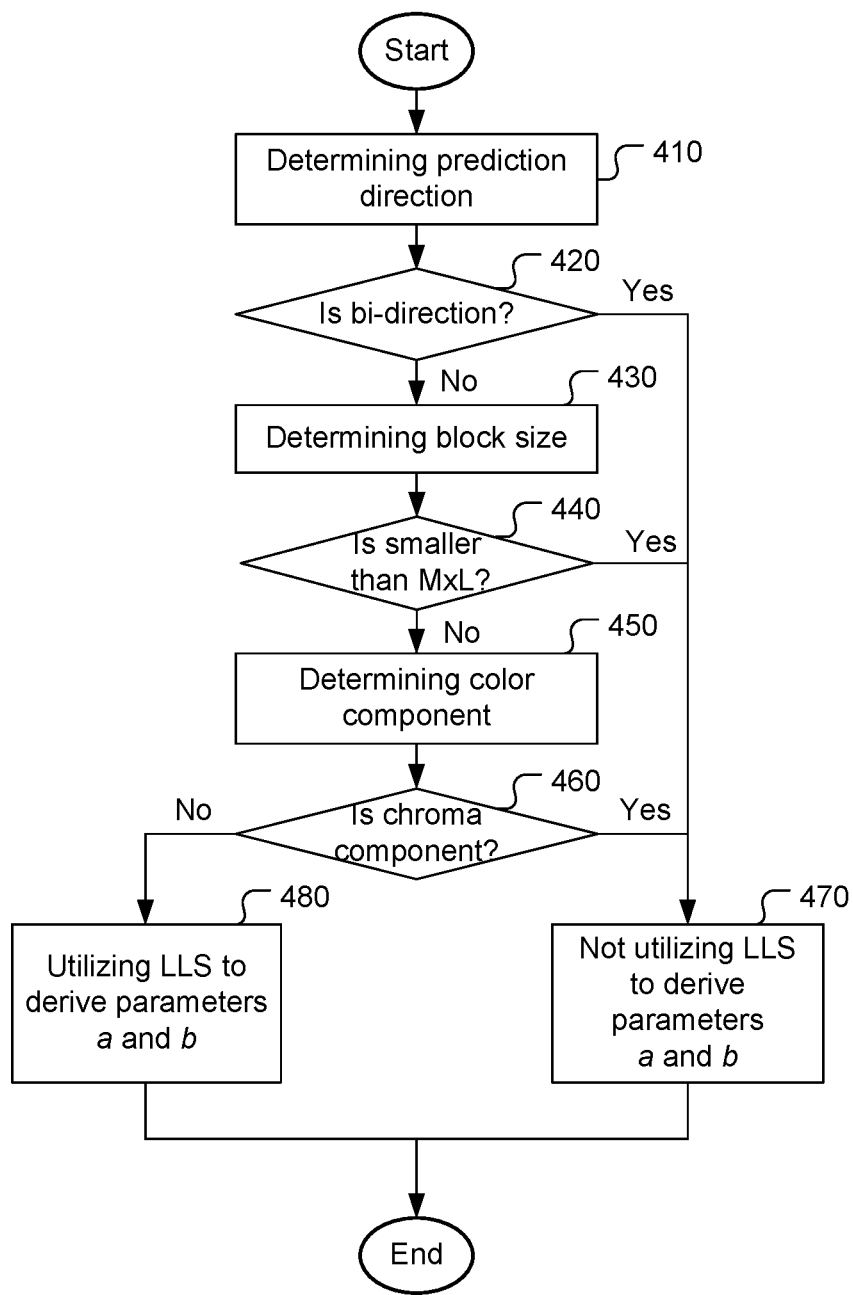
FIG. 4 illustrates an exemplary flowchart for a coding system incorporating simplified linear least squares (LLS) procedure for deriving model parameters according to an embodiment of the present invention.

Another aspect of the present invention addresses the illumination compensation (IC) process. In particular, the present invention discloses a method to further reduce the complexity of illumination compensation by reducing the usage frequency of linear least square (LLS) procedure. The present invention further checks whether LLS can be skipped. FIG. 4 illustrates an example of LLS skipping according to an embodiment of the present invention. The example shown in FIG. 4 determines the prediction direction in step 410. Whether the prediction direction is bi-directional is checked in step 420. If the result is "Yes", the process goes to step 470 and no LLS is applied to derive parameter a (i.e., multiplicative term) and parameter b (i.e., offset term) of the linear model (e.g., linear function) for relating current samples of the current block to reference samples of the reference block in the reference view. If the result is "No", the process goes to step 430 to further determine the block size. Whether the block size is smaller than M×L is checked in step 440. If the result is "Yes", the process goes to step 470 and no LLS is applied to derive parameters a and b. If the result is "No", the process goes to step 450 to further determine the color component. Whether the color component is chroma is checked in step 460. If the result is "Yes", the process goes to step 470 and no LLS is applied to derive parameters a and b. If the result is "No", the process goes to step 480 and the LLS is applied to derive parameters a and b.

In the first embodiment of simplified IC process, if the current derived predicted direction is bi-directional prediction in the IC mode, the bi-directional prediction is set as a forward prediction direction and other prediction information is not changed. Alternatively, the IC process according to this embodiment may derive parameters a and b based on a non-LLS method.

In the second embodiment of simplified IC process, the encoder will not perform the bi-directional prediction for the IC mode, or will not perform the LLS procedure to calculate parameters a and b.

In the third embodiment of simplified IC process, the decoder will not perform the bi-directional prediction for the IC mode, or will not perform the LLS procedure to derive parameters a and b.

In the fourth embodiment of simplified IC process, when the current block is coded in the IC mode, the flags in video bitstream that identify the prediction direction are limited to the forward direction and the backward direction.

In the fifth embodiment of simplified IC process, when the current block is coded in the IC mode, not all color components utilize the LLS procedures to derive parameters a and b.

In the sixth embodiment of simplified IC process, when the current block is coded in the IC mode and if the block size is smaller than M×L, parameter a is equal to a rounding value of $\Sigma y(i)/\Sigma x(i)$ for some color components, where y(i) corresponds to a neighboring sample in the current block and x(i) is a neighboring sample of the reference block. M and L are positive integers.

In the seventh embodiment of simplified IC process, when the current block is coded in the IC mode and if the block size is smaller than M×L, parameter a is equal to division-translated-to-multiplication values of $\Sigma y(i)/\Sigma x(i)$.

In the eighth embodiment of simplified IC process, when the current block is coded in the IC mode and if the block size is smaller than M×L, parameter a is equal to 1 and b is equal to $\Sigma y(i) - \Sigma x(i)$ for some color components.

In the ninth embodiment of simplified IC process, when the current block is coded in the IC mode and if the block size is smaller than M×L, parameter a is equal to the corresponding values derived from some additional flags for some color components. The additional flags are transmitted in the sequence, slice, Coding Unit (CU) or Transform Unit (TU) level.

In the tenth embodiment of simplified IC process, when the current block is coded in the IC mode and if the block size is smaller than M×L, the IC process does not utilize the IC procedure for some color components. Instead, the IC process for these color components utilizes normal prediction mode, which is equivalent to IC process with parameter a=1 and b=0, to complete the prediction.

In the eleventh embodiment of simplified IC process, when the current block is coded in the IC mode, if the block size is smaller than M×L, the IC process does not utilize the LLS procedure to calculate parameter a for chroma components. Instead, parameter a is set to 1 for these chroma components.

In the twelfth embodiment of simplified IC process, the M and L for any instance referred in the above embodiments can be set values larger than 64.

The embodiments mentioned above may also be combined. For example, when the bi-directional prediction is used, the bi-directional prediction can be set as a forward prediction direction as described in the first embodiment. At the same time, parameter a for some color components can be equal to a rounding value of $\Sigma y(i)/\Sigma x(i)$ according to the sixth embodiment.

The performance of a system incorporating an embodiment of the present invention is compared to that of a conventional system. The system incorporating an embodiment of the present invention disables bi-directional prediction when the illumination compensation (IC) is turned on. On the other hand, the conventional system enables bi-directional prediction when the IC is turned on. The performance loss in terms of BD-rate due to the simplified IC process is very minor (about 0.01%). The BD-rate is a well-known performance measure used in the field of video coding. In other words, this embodiment simplifies the IC process without performance penalty. In another embodiment, parameter a derivation for chroma component is disabled. Again, the performance loss in terms of BD-rate due to the simplified IC process is very minor (about 0.01%).

The present invention further addresses the aspect of partition mode coding for 3D and multi-view video coding systems by imposing limitations to the value range of a syntax element of partition mode (e.g., part_mode) when the texture partition variable such as partPredIdc is not equal to 0 and/or by handling illegal part_mode values for the decoder side.

In the first embodiment of partition mode coding, when partPredIdc is equal to 1 (i.e., indicating horizontal partition), only the part_mode values corresponding to horizontal and 2N×2N partitions are allowed.

In the second embodiment of partition mode flag coding, when partPredIdc is equal to 2 (i.e., indicating vertical partition), only the part_mode values corresponding to vertical and 2N×2N partitions are allowed.

In the third embodiment of partition mode flag coding, if the same part_mode values at different partPredIdc values indicate the same partition mode and the AMP (asymmetric motion partition) mode is allowed, only the part_mode values of 0, 1, 4 and 5 (i.e., 2N×2N, 2N×N, 2N×nU and 2N×nD) are allowed when partPredIdc is equal to 1.

In the fourth embodiment of partition mode flag coding, if the same part_mode values at different partPredIdc values indicate the same partition modes and the AMP mode is disallowed, only the part_mode values of 0 and 2 (i.e., 2N×2N and N×2N) are allowed when partPredIdc is equal to 2.

In the fifth embodiment of partition mode flag coding, if the same part_mode values at different partPredIdc values indicate the same partition mode and the AMP mode is disallowed, only the part_mode values of 0 and 1 (i.e., 2N×2N and 2N×N) are allowed when partPredIdc is equal to 1.

In the sixth embodiment of partition mode flag coding, if the same part_mode values at different partPredIdc values indicate the different partition modes and AMP mode is allowed, only the part_mode values of 0, 1, 2 and 3 (i.e., 2N×2N, 2N×N, N×2N and N×N) are allowed when partPredIdc is not equal to 0.

In the seventh embodiment of partition mode flag coding, if the same part_mode values at different partPredIdc values indicate the different partition modes and the AMP mode is disallowed, only the part_mode values of 0 and 1 (i.e., 2N×2N and 2N×N) are allowed when partPredIdc is not equal to 0.

In the eighth embodiment of partition mode flag coding, if the transmitted or decoded part_mode is illegal, a specified partition mode among the legal mode is set for the current prediction unit.

In the ninth embodiment of partition mode flag coding, if the transmitted or decoded part_mode is illegal and the current prediction mode is Inter, the current prediction unit utilizes 2N×2N Inter mode.

In the tenth embodiment of partition mode flag coding, if the transmitted or decoded part_mode is illegal and the current prediction mode is Intra, the current prediction unit uses 2N×2N Intra mode.

In the eleventh embodiment of partition mode flag coding, if the transmitted or decoded part_mode is illegal and the current prediction mode is Inter, the current prediction unit uses 2N×N Inter mode when partPredIdc is equal to 1.

In the twelfth embodiment of partition mode flag coding, if the transmitted or decoded part_mode is illegal and the current prediction mode is Inter, the current prediction unit utilizes N×2N Inter mode when partPredIdc is equal to 2.

In the thirteenth embodiment of partition mode flag coding, if the transmitted or decoded part_mode is an illegal AMP mode, the current prediction unit uses N×2N Inter mode the decoded partition mode is nL×2N or nR×2N.

In the fourteenth embodiment of partition mode flag coding, if the transmitted or decoded part_mode is an illegal AMP mode, the current prediction unit uses 2N×N Inter mode when the decoded partition mode is 2N×nU or 2N×nD.

In the fifteenth embodiment of partition mode flag coding, if the transmitted or decoded part_mode is illegal and the current prediction mode is Inter, the current prediction unit uses the decoded illegal Inter mode.

Figure 5:
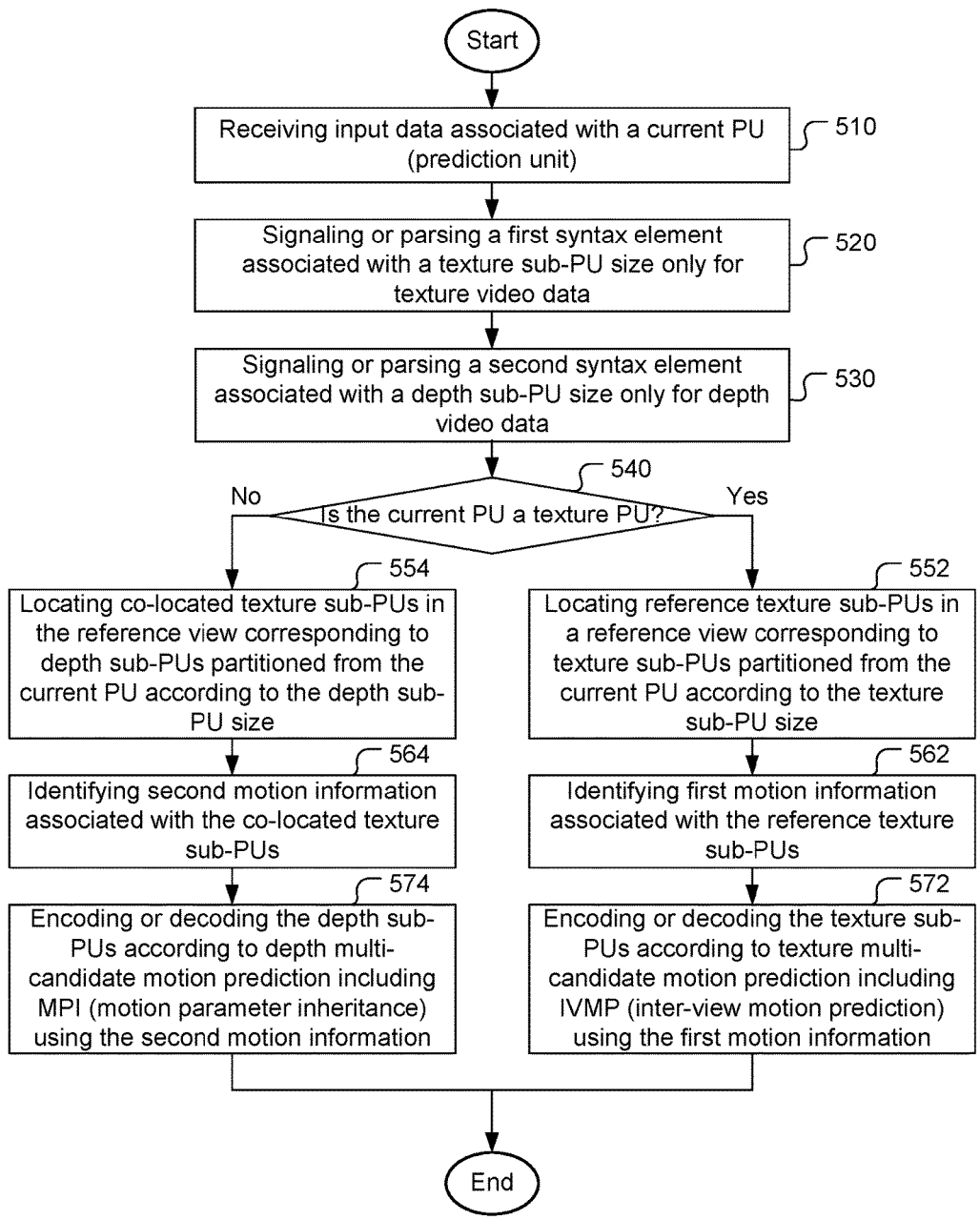
FIG. 5 illustrates an exemplary flowchart of 3D or multi-view coding system using sub-PU (prediction unit) size syntax element signaling according to an embodiment of the present invention.

FIG. 5 illustrates an exemplary flowchart of a three-dimensional or multi-view video coding system incorporating sub-PU (prediction unit) syntax element coding for texture data and depth data according to an embodiment of the present invention. The system receives input data associated with a current PU (prediction unit) as shown in step 510. For encoding, the input data corresponds to texture data or depth data to be encoded. For decoding, the input data corresponds to coded texture data or depth data to be decoded. The input data may be retrieved from memory (e.g., computer memory, buffer (RAM or DRAM) or other media) or from a processor. A first syntax element associated with a texture sub-PU size is signaled (for encoder) or parsed (for decoder) only for texture video data as shown in step 520. A second syntax element associated with a depth sub-PU size is signaled (for encoder) or parsed (for decoder) only for depth video data in step 530. In step 540, whether the current PU is a texture PU is checked. If the result is "Yes" (i.e., the current PU being a texture PU), steps 552, 562 and 572 corresponding to IVMP (inter-view motion prediction) for texture data in a dependent view are performed. If the result is "No" (i.e., the current PU being a depth PU), steps 554, 564 and 574 corresponding to MPI (motion parameter inheritance) for depth coding are performed. In step 552, reference texture sub-PUs in a reference view is located corresponding to texture sub-PUs partitioned from the current PU according to the texture sub-PU size. In step 562, first motion information associated with the reference texture sub-PUs is identified. In step 572, the texture sub-PUs are encoded or decoded according to texture multi-candidate motion prediction including IVMP (inter-view motion prediction) using the first motion information. In step 554, co-located texture sub-PUs in the reference view corresponding to depth sub-PUs partitioned are located from the current PU according to the depth sub-PU size. In step 564, second motion information associated with the co-located texture sub-PUs is identified. In step 574, the depth sub-PUs are encoded or decoded according to depth multi-candidate motion prediction including MPI (motion parameter inheritance) using the second motion information.

Figure 6:
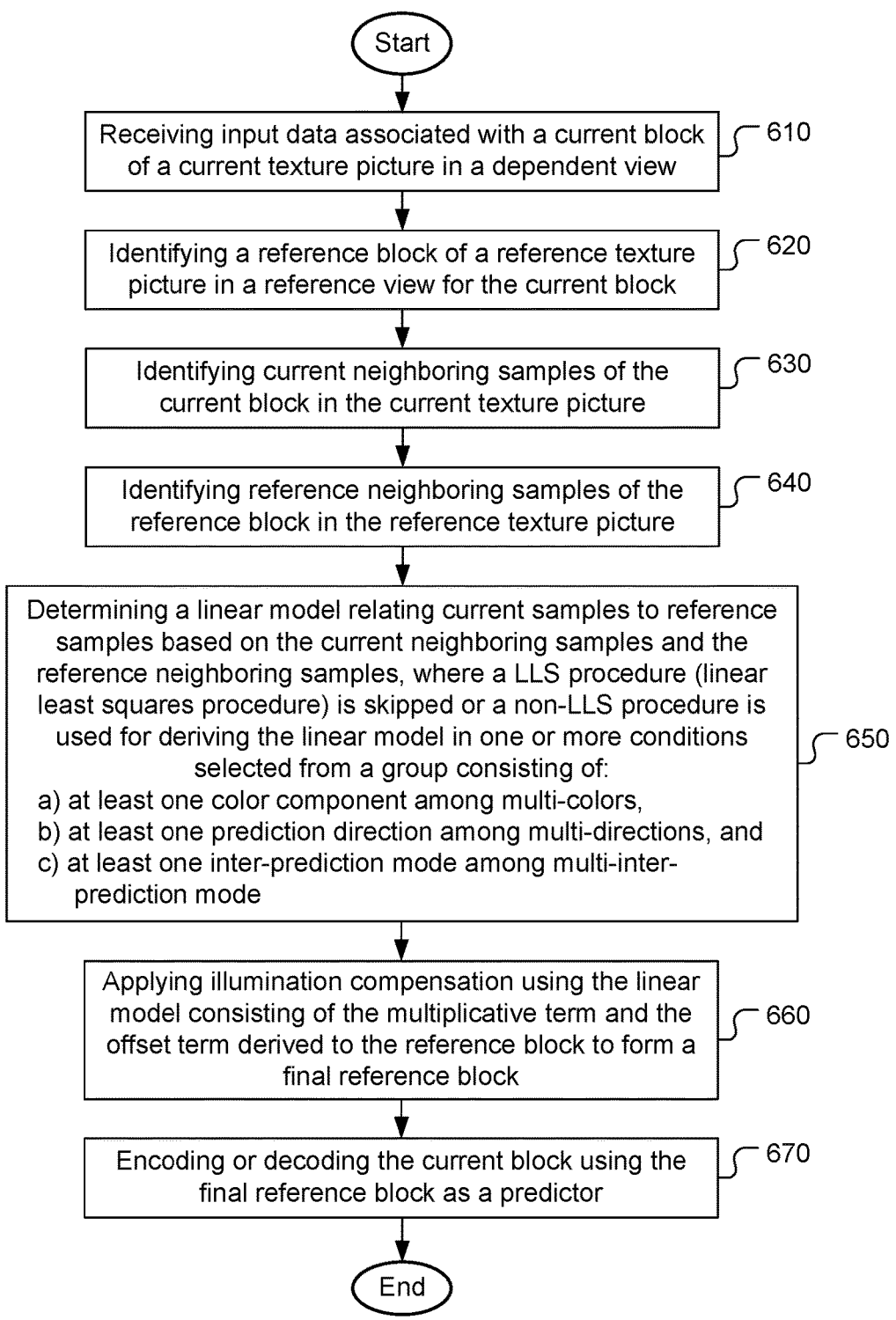
FIG. 6 illustrates an exemplary flowchart of 3D or multi-view coding system using simplified LLS (linear least squares) procedure for deriving model parameters according to an embodiment of the present invention.

FIG. 6 illustrates an exemplary flowchart of 3D or multi-view coding system using simplified LLS (linear least squares) procedure for deriving model parameters according to an embodiment of the present invention. The system receives input data associated with a current block of a current texture picture in a dependent view in step 610. A reference block of a reference texture picture in a reference view for the current block is identified in step 620. Current neighboring samples of the current block in the current texture picture are identified in step 630. Reference neighboring samples of the reference block in the reference texture picture are identified in step 640. A linear model relating current samples to reference samples based on the current neighboring samples and the reference neighboring samples is determined in step 650. In the linear model derivation, a LLS procedure (linear least squares procedure) is skipped or a non-LLS procedure is used for deriving the linear model under some conditions, where one or more conditions are selected from a group consisting of:

a) at least one color component among multi-colors, b) at least one prediction direction among multi-directions, and c) at least one inter-prediction mode among multi-inter-prediction mode.

Illumination compensation using the linear model consisting of the multiplicative term and the offset term derived is applied to the reference block to form a final reference block is step 660. The current block using the final reference block as a predictor is encoded or decoded in step 670.

Figure 7:
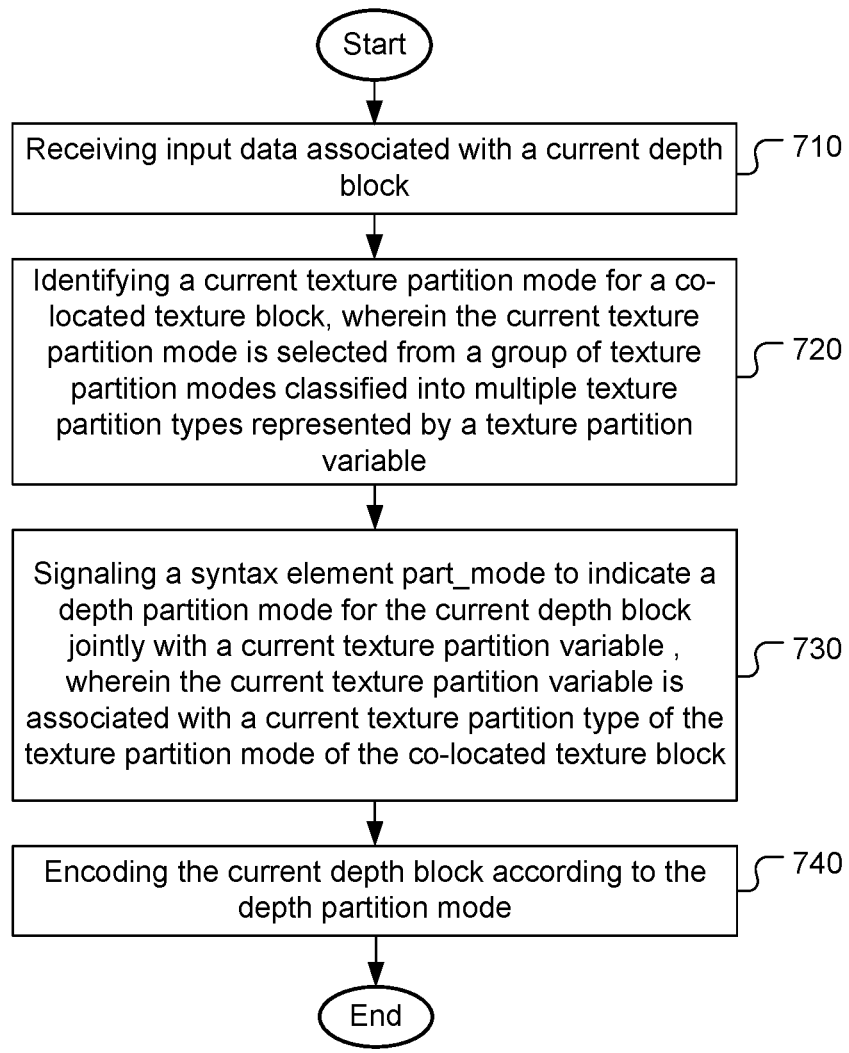
FIG. 7 illustrates an exemplary flowchart of 3D or multi-view coding system incorporating texture-dependent depth partition mode encoding according to an embodiment of the present invention.

FIG. 7 illustrates an exemplary flowchart of 3D or multi-view coding system incorporating texture-dependent depth partition mode encoding according to an embodiment of the present invention. As mentioned before, the issue with partition mode coding in existing 3D-HEVC or 3D-AVC can be resolved at the encoder side and/or the decoder side according to the present invention. The flowchart in FIG. 7 corresponds to an embodiment for the encoder side. Input data associated with a current depth block is received in step 710. A current texture partition mode for a co-located texture block is identified in step 720, where the current texture partition mode is selected from a group of texture partition modes classified into multiple texture partition types represented by a texture partition variable partPredIdc. For example, the group of texture partition modes corresponds to the partition modes with values from 0 to 7 for Inter coding as shown in Tables 2 and 3. The multiple texture partition types may correspond to the texture partition types associated with texture partition variable partPredIdc. In the existing 3D-HEVC, partPredIdc with a value of 1 indicates a horizontal partition is used and partPredIdc with a value of 2 indicates a vertical partition is used. When partPredIdc is equal to 0, a 2N×2N partition mode or N×N partition mode is used. A syntax element part_mode having a part_mode value depending on a current texture partition variable partPredIdc is signaled to indicate a depth partition mode for the current depth block jointly with a current texture partition variable partPredIdc in step 730, wherein the current texture partition variable partPredIdc is associated with a current texture partition type of the texture partition mode of the co-located texture block. Table 3 illustrates an example that the depth partition is jointly identified by part_mode and partPredIdc. The current depth block is encoded according to the depth partition mode in step 740.

Figure 8:
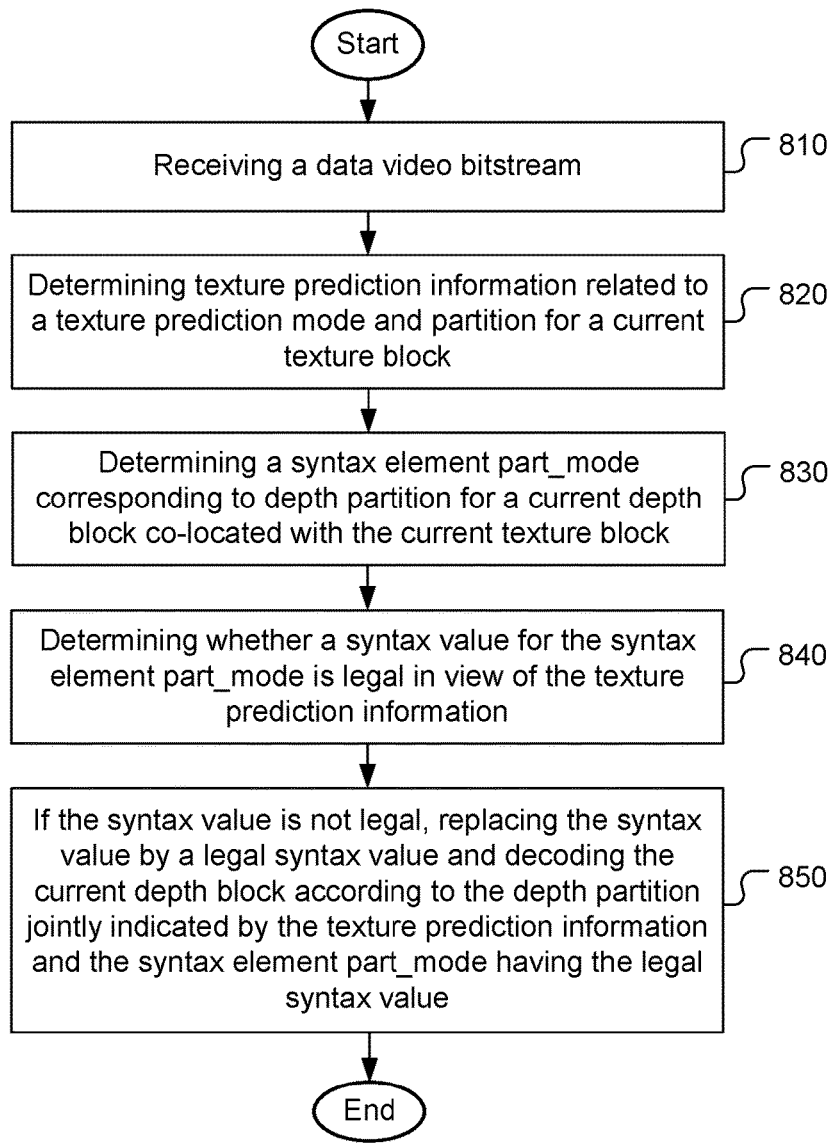
FIG. 8 illustrates an exemplary flowchart of 3D or multi-view coding system incorporating texture-dependent depth partition mode decoding according to an embodiment of the present invention.

FIG. 8 illustrates an exemplary flowchart of 3D or multi-view coding system incorporating texture-dependent depth partition mode decoding according to an embodiment of the present invention. A video bitstream is received in step 810. Texture prediction information related to a texture prediction mode and partition for a current texture block is determined in step 820. A syntax element part_mode corresponding to depth partition for a current depth block co-located with the current texture block is determined in step 830. Whether a syntax value for the syntax element part_mode is legal in view of the texture prediction information is determined in step 840. If the syntax value is not legal, the syntax value is replaced by a legal syntax value and the current depth block is decoded according to the depth partition jointly indicated by the texture prediction information and the syntax element part_mode having the legal syntax value in step 850.

The flowcharts shown above are intended to illustrate examples of 3D and multi-view coding according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional or multi-view video encoding or decoding of video data, the method comprising:
   receiving input data associated with a current PU (prediction unit);
   signaling or parsing a first syntax element associated with a texture sub-PU size only for texture video data, wherein the first syntax element corresponds to IVMP (inter-view motion prediction);
   signaling or parsing a second syntax element associated with a depth sub-PU size only for depth video data, wherein the second syntax element corresponds to MPI (motion parameter inheritance);
   if the current PU is a texture PU:
   locating reference texture sub-PUs in a reference view corresponding to texture sub-PUs partitioned from the current PU according to the texture sub-PU size;
   identifying first motion information associated with the reference texture sub-PUs; and
   encoding or decoding the texture sub-PUs according to texture multi-candidate motion prediction including IVMP (inter-view motion prediction) using the first motion information;
   if the current PU is a depth PU:
   locating co-located texture sub-PUs in the reference view corresponding to depth sub-PUs partitioned from the current PU according to the depth sub-PU size;
   identifying second motion information associated with the co-located texture sub-PUs; and
   encoding or decoding the depth sub-PUs according to depth multi-candidate motion prediction including MPI (motion parameter inheritance) using the second motion information.

2. The method of claim 1, wherein the first syntax element and the second syntax element are signaled in video parameter set (VPS), sequence parameter set (SPS), adaptive parameter set (APS), or slice header.

3. The method of claim 1, wherein when layer ID is larger than zero, the first syntax element is signaled for a texture coding layer while the second syntax element is signaled for a depth coding layer.

4. The method of claim 1, wherein the second syntax element is signaled in a depth coding layer with layer ID equal to zero.

5. An apparatus for three-dimensional or multi-view video encoding or decoding of video data, the apparatus comprising:
   a memory;
   one or more electronic circuits configured to:
   receive input data associated with a current PU (prediction unit);

signal or parse a first syntax element associated with a texture sub-PU size only for texture video data, wherein the first syntax element corresponds to IVMP (inter-view motion prediction);

signal or parse a second syntax element associated with a depth sub-PU size only for depth video data, wherein the second syntax element corresponds to MPI (motion parameter inheritance);

if the current PU is a texture PU:

locate reference texture sub-PUs in a reference view corresponding to texture sub-PUs partitioned from the current PU according to the texture sub-PU size;

identify first motion information associated with the reference texture sub-PUs; and encode or decode the texture sub-PUs according to texture multi-candidate motion prediction including IVMP (inter-view motion prediction) using the first motion information;

if the current PU is a depth PU:

locate co-located texture sub-PUs in the reference view corresponding to depth sub-PUs partitioned from the current PU according to the depth sub-PU size;

identify second motion information associated with the co-located texture sub-PUs; and encode or decode the depth sub-PUs according to depth multi-candidate motion prediction including MPI (motion parameter inheritance) using the second motion information.

6. The apparatus of claim 5, wherein the one or more electronic circuits are further configured to signal the first syntax element and the second syntax element in video parameter set (VPS), sequence parameter set (SPS), adaptive parameter set (APS), or slice header.

7. The apparatus of claim 5, wherein when layer ID is larger than zero, the one or more electronic circuits are further configured to signal the first syntax element for a texture coding layer while signaling the second syntax element for a depth coding layer.

8. The apparatus of claim 5, wherein the one or more electronic circuits are further configured to signal the second syntax element in a depth coding layer with layer ID equal to zero.

9. A non-transitory, machine readable media comprising machine readable code configured to perform three-dimensional or multi-view video encoding or decoding of video data when executed by one or more processors, the machine readable code configured to cause the one or more processors to:

receive input data associated with a current PU (prediction unit);

signal or parse a first syntax element associated with a texture sub-PU size only for texture video data, wherein the first syntax element corresponds to IVMP (inter-view motion prediction;

signal or parse a second syntax element associated with a depth sub-PU size only for depth video data, wherein the second syntax element corresponds to MPI (motion parameter inheritance);

if the current PU is a texture PU:

locate reference texture sub-PUs in a reference view corresponding to texture sub-PUs partitioned from the current PU according to the texture sub-PU size;

identify first motion information associated with the reference texture sub-PUs; and encode or decode the texture sub-PUs according to texture multi-candidate motion prediction including IVMP (inter-view motion prediction) using the first motion information;

if the current PU is a depth PU:

locate co-located texture sub-PUs in the reference view corresponding to depth sub-PUs partitioned from the current PU according to the depth sub-PU size;

identify second motion information associated with the co-located texture sub-PUs; and encode or decode the depth sub-PUs according to depth multi-candidate motion prediction including MPI (motion parameter inheritance) using the second motion information.

10. The non-transitory, machine readable media of claim 9, wherein the machine readable code is further configured to cause the one or more processors to signal the first syntax element and the second syntax element in video parameter set (VPS), sequence parameter set (SPS), adaptive parameter set (APS), or slice header.

11. The non-transitory, machine readable media of claim 9, wherein the machine readable code is further configured to cause the one or more processors to signal the first syntax element for a texture coding layer while the second syntax element is signaled for a depth coding layer when layer ID is larger than zero.

12. The non-transitory, machine readable media of claim 9, wherein the machine readable code is further configured to cause the one or more processors to signal the second syntax element in a depth coding layer with layer ID equal to zero.

* * * * *